United States Patent [19]
Amos

[11] 3,973,534
[45] Aug. 10, 1976

[54] CARBURETOR AERATOR

[76] Inventor: Russell J. Amos, 1415 Nye St., San Rafael, Calif. 94901

[22] Filed: June 7, 1974

[21] Appl. No.: 477,304

[52] U.S. Cl. .................. 123/119 D; 123/119 B; 123/124 R
[51] Int. Cl.² .................................. F02B 33/00
[58] Field of Search ......... 123/119 D, 119 B, 124 R

[56] References Cited
UNITED STATES PATENTS

| | | | |
|---|---|---|---|
| 2,250,200 | 7/1941 | Lowther | 123/119 D |
| 2,602,435 | 7/1952 | Boyan | 123/119 D |
| 3,166,061 | 1/1965 | Weiser | 123/119 B |
| 3,287,899 | 11/1966 | Bintz | 123/119 D |
| 3,463,132 | 8/1969 | Krieck | 123/119 B |
| 3,564,580 | 2/1971 | Cingue | 123/119 D |
| 3,664,368 | 5/1972 | Sweeney | 123/119 B |
| 3,742,923 | 7/1973 | Obländer et al. | 123/119 D |
| 3,809,035 | 5/1974 | Winton | 123/119 D |
| 3,810,454 | 5/1974 | Hunt | 123/124 R X |
| 3,820,518 | 6/1974 | Dolfi | 123/119 B |

Primary Examiner—Charles J. Myhre
Assistant Examiner—James D. Liles
Attorney, Agent, or Firm—Owen, Wickersham & Erickson

[57] ABSTRACT

An internal combustion engine aerator apparatus introduces additional air into the air-fuel mixture downstream of the carburetor in combination with the gases vented from the crankcase by the pcv valve hose.

6 Claims, 1 Drawing Figure

CARBURETOR AERATOR

BACKGROUND OF THE INVENTION

This invention relates to a carburetor aerator for introducing additional air into the air-fuel mixture downstream of the carburetor to increase the conversion of the liquid fuel droplets to vapor. It relates particularly to an aerator apparatus which works in combination with the gases vented from the crankcase by the pcv valve hose.

The emission controls which are required to reduce air pollution from automobiles do, without question, lower gas mileage. These emission controls are considered, as a conservative estimate, to reduce mileage 20% or more. Many feel that it is more realistic to consider that the emission controls reduce gas mileage 30% to 40%.

Since the onset of the recent energy shortage, the need to improve the gasoline mileage of automobiles, and in particular, the large number of existing automobiles now on the roads, has become an accepted fact.

It is known that gasoline mileage can be increased if more of the liquid fuel droplets in the air-fuel carbureted mixture can be converted to vapor. Many prior art techniques and devices have been proposed and tried for increasing such vaporization. For example, vapor injectors using either water or a chemical have been used, ozone injectors have been used, and various types of air injectors have been used.

The problem is to increase the vaporization without disturbing the emission controls presently installed on existing automobiles and required for all newly constructed automobiles.

SUMMARY OF THE PRESENT INVENTION

It is a primary object of this invention to introduce additional air into the air-fuel mixture downstream of the carburetor in combination with the gases vented from the crankcase by the pcv valve hose. It is a corollary object to do this in a way that does not disturb the proper operation of the emission controls.

It is a related object to construct an engine aerator apparatus of minimum parts of simple construction and in a way that permits quick and easy installation both on existing cars and on new cars as manufactured.

It is another object of the present invention to construct and install the aerator apparatus in a way that provides improved engine operation and fuel mileage under all conditions of engine operation from start up through idle, acceleration and deceleration and steady state operation at all speeds.

It is another object to produce better vaporization of the fuel in a way that is effective to keep the oil clean and to reduce engine sludge.

An engine aerator apparatus constructed in accordance with the present invention includes an aerator hose for conducting the additional air, an adjustable valve in the hose for regulating the amount of air that can be drawn through the hose by engine intake suction downstream of the carburetor, a unidirectional valve at the inlet end of the hose for permitting substantially free entry of atmospheric air into the hose while preventing reverse flow of crankcase gases or loss of vacuum through the inlet end, and fitting means for connecting the outlet end of the hose to the air-fuel intake structure downstream of the carburetor in parallel with the pcv valve hose and closely adjacent to the point of connection of the pcv valve hose to the engine air-fuel intake structure.

Engine aerator apparatus and methods which incorporate the structure and techniques described above and which are effective to function as described above constitute specific objects of this invention.

Other objects, advantages and features of my invention will become apparent from the following detailed description of preferred embodiments taken with the accompanying drawings.

DESCRIPTION OF THE PREFERRED EMBODIMENTS

Figure 1:
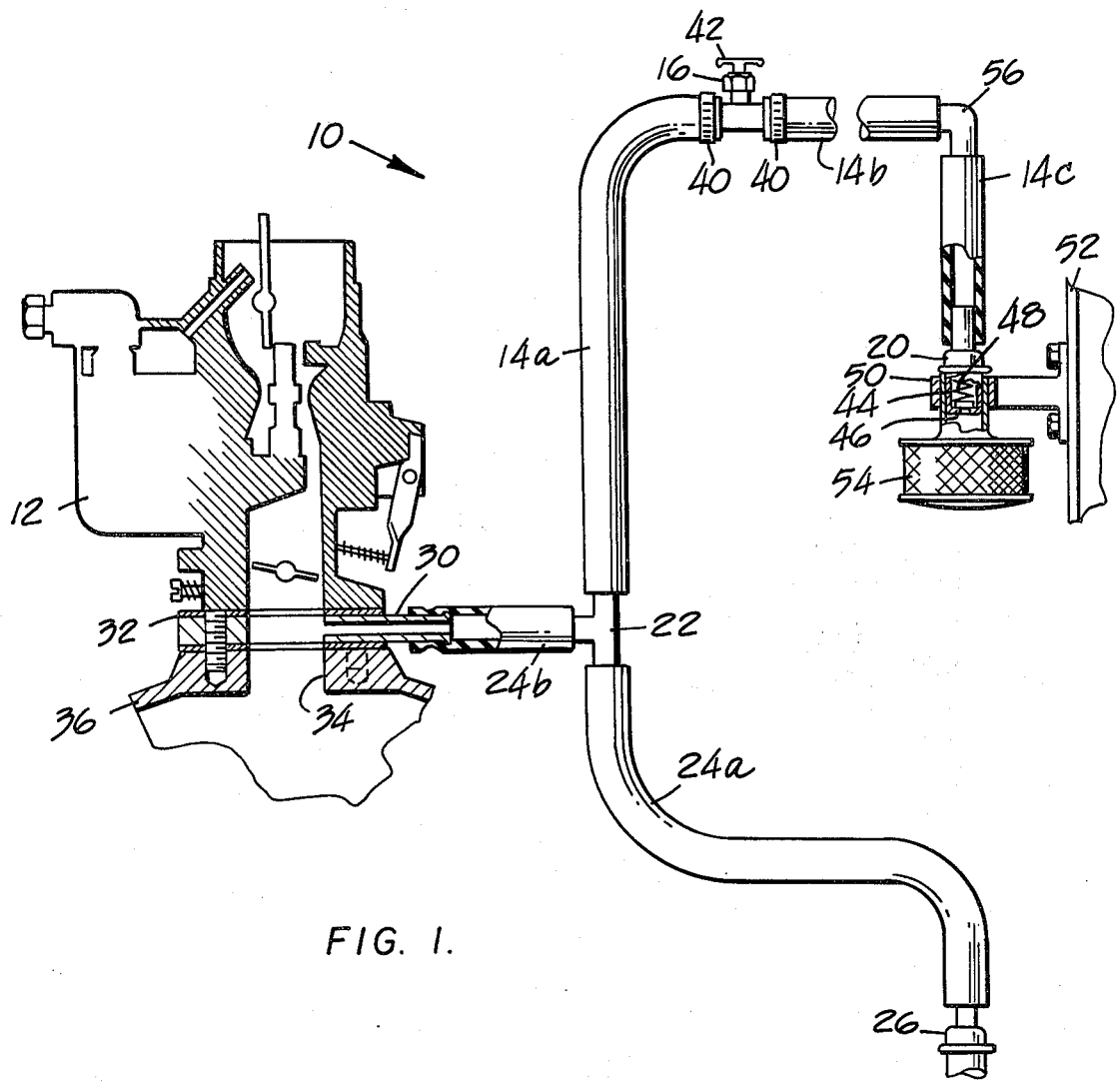
FIG. 1 is an elevation view showing an engine aerator apparatus constructed in accordance with one embodiment of the present invention.

An internal combustion engine aerator apparatus constructed in accordance with one embodiment of the present invention is indicated generally by the reference numeral 10 in FIG. 1.

The aerator apparatus 10 is shown associated with a single barreled carburetor 12. It can equally well be connected for operation with any other carburetor, such as a two barrel or a four barrel carburetor.

The aerator apparatus 10 includes an aerator hose 14 comprising three sections, 14a, 14b and 14c.

An adjustable valve 16 is located between the hose sections 14a and 14b for regulating the amount of air that can be drawn through the hose by engine intake suction.

A unidirectional valve 20 is positioned at the inlet end of the hose section 14c for permitting substantially free entry of atmospheric air into the hose while preventing reverse flow of crankcase gases or loss of vacuum through the inlet end of the aerator hose 14.

A fitting 22 connects the outlet end of the hose 14 (in parallel with the pcv valve hose 24) to the engine air-fuel intake downstream of the carburetor 12. The fitting 22 is located closely adjacent to the existing connection of the pcv valve hose to the engine air-fuel intake structure.

In the embodiment of the invention illustrated in FIG. 1 the fitting 22 is a T-fitting. One end of the T-fitting is inserted in the end of the aerator hose section 14a. Another end of the T-fitting is inserted in the hose section 24a which is connected to the standard pcv valve 26. The third end of the T-fitting is connected to the short hose section 24b which is in turn connected to an inlet end 30 of a carburetor adapter plate 32. The carburetor adapter plate 32 is positioned between the outlet end of the carburetor 12 and the intake manifold 34 of the engine 36.

The adjustable valve 16 is connected between the aerator hose sections 14a and 14b by hose clamps 40 and has a manually rotatable valve element 42 which can be adjusted to permit the desired amount of air flow through the aerator hose 14.

In the embodiment of the invention illustrated in FIG. 1 the unidirectional valve 20 is a conventional smog valve which is used as an inlet check valve for the aerator hose.

The valve has a movable disc 44 which is normally held in engagement with the valve seat formed by the inturned lower end 46 when the valve is positioned vertically as illustrated. In this vertical position the weight of the valve disc 44 and the light biasing force exerted by the spring 48 keep the valve disc 44 seated on the valve seat 46 until the engine intake suction permits the pressure of the ambient air to unseat the valve disc 44 and produces a flow of air through the aerator hose 14.

A mounting clamp 50 is bolted or otherwise attached to a fender well 52 or other structure in the engine compartment to hold the unidirectional valve 20 in the vertical position illustrated. To accommodate the vertical mounting of the valve 20, the hose sections 14b and 14c are connected by a standard L-fitting 56.

A filter 54 is preferably mounted on the intake end of the valve 20 to filter the incoming air.

While the valve 16 is shown as having a valve stem which is manually adjustable right at the valve itself, it can equally well be adjusted from the passenger compartment by a dash-mounted dial and a connection to the valve stem 42. In this event the dial adjustment is preferably mounted next to a conventional guage (as used in aircraft) which shows the carburetor mixture ratio. The valve 16 permits adjusting the air flow to the driving needs.

In operation, the engine intake suction draws an amount of aerating air through the hose 14 in parallel with the pcv ventilation through the hose 24. The air flowing through the aerator hose 14 mixes with the air fuel mixture downstream of the carburetor and substantially increases the vaporization of the liquid fuel droplets. This has a number of beneficial results.

The engine starts quicker because the vaporization of the liquid fuel is increased.

The engine is more responsive to the accelerator. While the engine does not produce more speed, it does provide quicker acceleration and smoother engine operation because of the increased fuel vaporization.

Gas mileage is increased because of the increased fuel vaporization and resulting better combustion in the engine cylinders.

The oil is kept cleaner with less formation of sludge because of the increased vaporization. This reduces unburned gas being driven down past the engine pistons to reduce oil sludge.

Because less unburned gas is driven out of the exhaust system, air pollution is substantially reduced.

The aerator apparatus 10 operates effectively under all conditions of engine operation, including idle, acceleration, deceleration, and steady speed operation at any speed and load.

The carburetor aerator of the present invention does not disturb the emission controls presently installed on U.S. automobiles. It works very well in combination with the pcv connections.

In this regard it is desirable to mount the fitting 22 as close to the carburetor adapter plate 32 as possible. If the parallel connection to the pcv hose 24 is made too near the smog valve 26 the connection will tend to suck oil from the smog valve.

The aerator apparatus 10 is quickly installable because the outlet end of the aerator hose 14 is connected into the existing pcv hose 24. The hose 24 is simply cut in two sections 24a and 24b near the carburetor, and the T-fitting 22 is inserted to connect the aerator hose 14. While a T-fitting 22 is illustrated, Y-fitting can equally well be used.

The unidirectional valve 20 also acts in combination with the pcv connections to prevent any bleeding back of fumes or loss of vacuum out of the inlet end of the aerator hose 14.

The carburetor aerator apparatus 10 is a very simple construction requiring a minimum expense for parts and a minimum expense for installation. The total cost of the parts in the embodiment illustrated in FIG. 1 is less than $5.00, and the labor time to completely install and adjust the apparatus does not exceed 15 minutes by a garage or service station mechanic. The aerator apparatus 10 can be installed in the engine compartment without the need to drill any metal.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. An internal combustion engine aerator apparatus for introducing additional air into the air-fuel mixture of an engine of the kind having a crankcase, a carburetor, and air-fuel intake structure including an intake manifold and in combination with gases vented from the crankcase through a first smog valve, said aerator apparatus comprising, a pcv valve hose connected between the crankcase and the air-fuel intake structure, an aerator hose for conducting the additional air to be introduced, an adjustable valve associated with the aerator hose for regulating the amount of air that can be drawn through the aerator hose by the engine intake suction, unidirectional valve means at the inlet end of the aerator hose for permitting substantially free entry of atmospheric air into the aerator hose under all conditions of engine operation from start-up through idle, acceleration, deceleration and steady state operation at all speeds and loads while preventing reverse flow of crankcase gases or loss of vacuum through said inlet end, fitting means for conducting the other end of the aerator hose to the engine air-fuel intake structure at a point downstream of the carburetor in parallel with the pcv valve hose and closely adjacent to the point of connection of the pcv valve hose to said engine air-fuel intake structure, wherein said unidirectional valve means is a second smog valve having a valve seat and a valve check element and mounted vertically to insure proper operation of the valve check element on the valve seat without binding, and including a fender well close to said engine and wherein the second smog valve is mounted upright on the fender well so that the air passing through said second valve is warmed.

2. The invention defined in claim 1 wherein the second smog valve is connected to the hose by an L-fitting.

3. The invention defined in claim 1 including a filter mounted at the inlet to the second smog valve.

4. The invention defined in claim 1 wherein the fitting means include a T-fitting for connecting both the aerator hose and the pcv valve hose to a common connection to said engine air-fuel intake structure.

5. The invention defined in claim 1 wherein said fitting means include a Y-fitting for connecting both the aerator hose and the pcv valve hose to a common connection to said engine air-fuel intake structure.

6. The invention defined in claim 1 wherein both the aerator hose and the pcv valve hose are connected to a common fitting which is in turn connected to an adapter plate between the engine carburetor and the engine intake manifold.

* * * * *